United States Patent

Matsumoto et al.

[11] Patent Number: 5,849,466
[45] Date of Patent: Dec. 15, 1998

[54] THERMOPLASTIC RESIN MOLDED PRODUCT

[75] Inventors: Masahito Matsumoto, Ibaraki; Takeo Kitayama; Kiyoshi Ogura, both of Takatsuki; Masahiro Shinohata, Takatsuki, all of Japan

[73] Assignee: Sumitomo Chemical Company, Limited, Osaka, Japan

[21] Appl. No.: 784,812

[22] Filed: Jan. 16, 1997

[30] Foreign Application Priority Data

Jan. 17, 1996 [JP] Japan .................................. 8-005443

[51] Int. Cl.$^6$ ............................ B32B 15/08; B29C 37/00
[52] U.S. Cl. ....................... 428/327; 428/461; 428/462; 428/463
[58] Field of Search .................................. 428/327, 461, 428/462, 463

[56] References Cited

U.S. PATENT DOCUMENTS 4,312,962  1/1982  Campbell et al. ....................... 525/5

FOREIGN PATENT DOCUMENTS 6-322202  11/1994  Japan .

*Primary Examiner*—D. S. Nakarani
*Attorney, Agent, or Firm*—Pillsbury Madison & Sutro LLP

[57] ABSTRACT

A thermoplastic resin molded product comprises a thermoplastic resin containing 5 to 40% by weight of rubber particles. The rubber particles present near the surface of the molded product fulfill conditions of the equations (1) to (4):

$$(b/a) \leq 2 \tag{1}$$

where a and b are the average minor and major axis lengths in a section of the rubber particles, $$1 \leq \{(b/a)\text{max.}\}/\{(b/a)\text{min.}\} \leq 1.5 \tag{2}$$

where $\{(b/a)\text{max.}\}$ and $\{(b/a)\text{min.}\}$ are the maximum and minimum values of the ratios of (b/a), and $$0 \leq (A\text{max.}-A)/A \leq 0.2 \tag{3}$$

$$0 \leq (A-A\text{min.})/A \leq 0.2 \tag{4}$$

where Amax. and Amin. are the maximum and minimum values of the proportions of the areas accounted for by the rubber particles in sections of the molded product, and A is the average value of the proportions.

7 Claims, 3 Drawing Sheets

THERMOPLASTIC RESIN MOLDED PRODUCT

BACKGROUND OF THE INVENTION

1. Field of the Invention

This invention relates to a molded product of a thermoplastic resin containing rubber particles.

2. Related Background Art

Attempts have been made to use thermoplastic resins containing rubber particles for parts of automobiles, thereby improving their impact resistance and flexibility.

Conventional thermoplastic resin molded products produced by molding such thermoplastic resins containing rubber particles, however, have been apt to deform and crack.

In a case where, in particular, thermoplastic resin molded products using acrylonitrile-butadiene-styrene copolymer (ABS resin) which is a thermoplastic resin containing rubber particles have a metal plating layer that has been applied to the surface of the molded product for increased weatherability and mechanical strength, the molded products have posed the problem of poor durability of the metal plating layer.

SUMMARY OF THE INVENTION

The present invention has been accomplished in the light of the above-described problems of the prior art. An object of the present invention is to provide a molded product comprising a thermoplastic resin containing rubber particles, the molded product being fully prevented from deforming and cracking, and, even when ABS resin is used and a metal plating layer is provided on the surface of the molded product, the molded product having the metal plating layer whose durability is sufficiently high.

To attain such a product, the present inventors have conducted extensive study, and found that the rubber particles present near the surface of a conventional thermoplastic resin molded product are considerably flattened, and their flatness and abundance vary widely; that the shapes of the rubber particles present in the vicinity of the surface of the molded product, variations in their shapes (shape distribution), and the variation in their abundance (dispersibility of the rubber particles) all affect the deformation and cracking of the molded product and the durability of the metal plating layer; and that only when all these factors fulfill specific conditions, can the aforementioned object be achieved. These findings have led us to the present invention.

A thermoplastic resin molded product of the invention is a molded product comprising a thermoplastic resin containing 5 to 40% by weight of rubber particles, wherein the rubber particles present near the surface of the molded product fulfill conditions of the equations (1) to (4):

$$(b/a) \leq 2 \tag{1}$$

where a and b denote the average minor axis length and the average major axis length, respectively, of the rubber particles in a section in the thickness direction of the molded product, $$1 \leq \{(b/a)\max.\}/\{(b/a)\min.\} \leq 1.5 \tag{2}$$

where {(b/a)max.} and {(b/a)min.} stand for the maximum value and minimum value, respectively, of the ratios of b to a (b/a) in a plurality of sections in the thickness direction of the molded product, and $$0 \leq (A\max.-A)/A \leq 0.2 \tag{3}$$

$$0 \leq (A-A\min.)/A \leq 0.2 \tag{4}$$

where Amax. and Amin. represent the maximum value and minimum value, respectively, of the proportions of the areas accounted for by the rubber particles (the rubber-occupied area ratios) in a plurality of sections in the thickness direction of the molded product, and A represents the average value of the proportions of the areas accounted for by the rubber particles (the rubber-occupied area ratios) in a plurality of sections in the thickness direction of the molded product.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

A molded product of thermoplastic resin according to the present invention will now be described in more detail with reference to the accompanying drawings.

Figure 1:
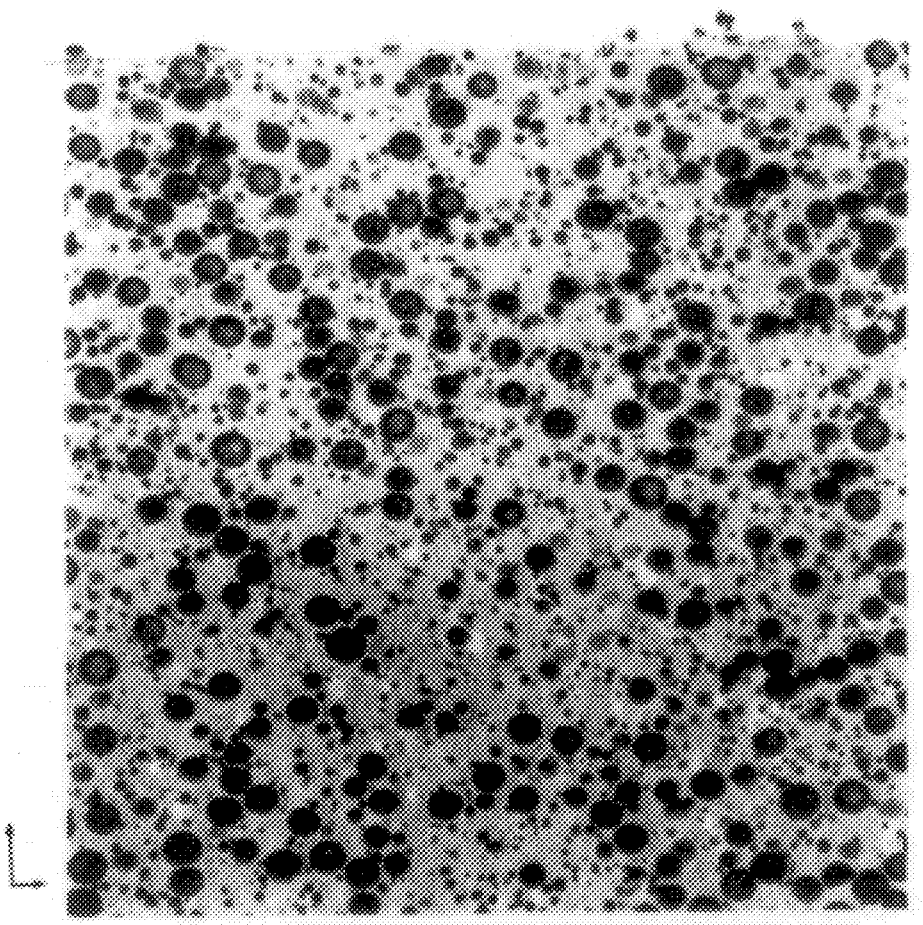
FIG. 1 is an electron micrograph (10,000×) of a section in the thickness direction of a portion within 10 μm from the surface of an example of a thermoplastic resin molded product according to the present invention.

FIG. 1 is an electron micrograph (10,000×) of a section in the thickness direction of a portion within 10 μm from the surface of an example of the claimed thermoplastic resin molded product. As shown in FIG. 1, rubber particles 1 (portion shown as black dots in the micrograph) are dispersed in a matrix resin 2 (portion other than black dots in the micrograph) in this molded product. The upper side of the figure corresponds to the surface side of the molded product.

The composition for the rubber component constituting the rubber particles and the thermoplastic resin as the matrix resin in the invention is not restricted. The rubber particles may be formed of any rubber component which is present in the form of particles without intimately mixing with the matrix resin. Preferred examples of such a rubber component are graft copolymers comprising diene rubbery polymers and vinyl monomers (e.g. aromatic vinyl monomers and/or vinyl cyanide monomers) grafted thereto, the vinyl monomers being copolymerizable with the polymers; and ethylene-a-olefin copolymers. Examples of the diene rubbery polymers include polybutadiene, styrene-butadiene copolymer, acrylonitrile-butadiene copolymer, and polyisoprene, two or more of which may be combined for use in the rubber component.

Examples of the matrix resin are copolymers of aromatic vinyl monomers with vinyl cyanide monomer, copolymers of aromatic vinyl monomers with vinyl cyanide monomer and further with other vinyl monomers, and thermoplastic resins such as polystyrene resins and polypropylene resins.

Preferred combinations of the rubber component and the matrix resin are exemplified by i) a combination of the rubber component that is a graft copolymer having a vinyl monomer grafted to a diene rubbery polymer, and the matrix resin that is a copolymer of an aromatic vinyl monomer with vinyl cyanide monomer or a copolymer of an aromatic vinyl monomer with vinyl cyanide monomer and further with another vinyl monomer, and ii) a combination of the rubber component that is an ethylene-α-olefin copolymer, and the matrix resin that is a polypropylene resin. More specifically, ABS resin containing rubber particles comprising the above-mentioned rubber component, and polypropylene resin containing rubber particles comprising ethylene-propylene copolymer are taken as examples of the rubber particles-containing thermoplastic resins preferred for the present invention.

The content of the rubber particles needs to be in the range of from 5 to 40% by weight in the resulting molded product. If the rubber particles content is outside this range, the impact resistance and flexibility of the molded product will be impaired.

The particle diameters of the rubber particles vary with the required properties, such as impact strength. They need not necessarily be uniform, but preferably, their number average particle diameter falls within the range of from 0.05 to 3 μm. If the number average particle diameter of the rubber particles is smaller than 0.05 μm, the rubber particles tend to be insufficiently dispersed and the impact resistance of the molded product tends to be insufficient. If it is larger than 3 μm, on the other hand, the surface of the molded product tends to lose luster. The particle diameter referred to herein means the largest diameter that the rubber particles have, a value measured in a section in the thickness direction at an arbitrary place of the resulting molded product.

The resin molded product of the present invention is a molded product obtained by molding a thermoplastic resin containing such rubber particles. The present inventors have found that the shapes of the rubber particles present near the surface (in the surface layer preferably within 30 μm, more preferably within 20 μm, most preferably within 10 μm, from the surface) of the molded product, variations in their shapes (shape distribution), and the variation in their abundance (dispersibility of the rubber particles) all exert serious influence on the deformation and cracking of the molded product and the durability of the metal plating layer.

In the thermoplastic resin molded product of the present invention, therefore, the rubber particles present near the surface of the molded product should fulfill conditions of the equations (1) to (4):

$$(b/a) \leq 2 \tag{1}$$

where a and b denote the average minor axis length and the average major axis length, respectively, of the rubber particles in a section in the thickness direction of the molded product, $$1 \leq \{(b/a)\max.\}/\{(b/a)\min.\} \leq 1.5 \tag{2}$$

where $\{(b/a)\max.\}$ and $\{(b/a)\min.\}$ stand for the maximum value and minimum value, respectively, of the ratios of b to a (b/a) in a plurality of sections in the thickness direction of the molded product, and $$0 \leq (A\max.-A)/A \leq 0.2 \tag{3}$$

$$0 \leq (A-A\min.)/A \leq 0.2 \tag{4}$$

where Amax. and Amin. represent the maximum value and minimum value, respectively, of the proportions of the areas accounted for by the rubber particles (the rubber-occupied area ratios) in a plurality of sections in the thickness direction of the molded product, and A represents the average value of the proportions of the areas accounted for by the rubber particles (the rubber-occupied area ratios) in a plurality of sections in the thickness direction of the molded product. The failure to fulfill any one of these conditions would result in the failure to attain the object of the invention. That is, if any of the shapes of the rubber particles (b/a), variations in their shapes $\{(b/a)\max.\}/\{(b/a)\min.\}$, and the variation in their abundance $\{(A\max.-A)$ and $(A-A\min.)\}$ falls outside the ranges of the above conditions, deformation or cracking will be liable to occur, and the durability of the metal plating layer will decline.

Here, the portion near the surface of the molded product (especially, the portion within 30 μm from the surface) is generally called a skin or skin layer, a region where the molten resin undergoes the greatest shearing force during molding. The skin is highly susceptible to the molding conditions such as the mold temperature and the feed pressure of the molten resin. The aforesaid definitions in the present invention are relevant to a section in the thickness direction of the skin.

The methods of measuring the aforementioned parameters concerned with the rubber particles in the vicinity of the surface of the thermoplastic resin molded product of the present invention are, for example, as follows: The molded product is cut in the thickness direction, and the cut portion is then sliced parallel to the cut surface by means of an ultramicrotome (e.g., Ultracut N, a product of Reiheldt) to obtain thin samples 700 to 800 angstroms thick. These samples are stained with, say, osmium tetroxide, and a part having an arbitrary area in a portion near the surface of the molded product (e.g., the portion within 30 μm from the surface), for instance, a part 10 μm square in a portion within 10 μm from the surface of the molded product, is observed for the section with a transmission electron microscope (e.g., 1200EX, a product of Nihon Denshi) under magnification (10,000×).

The observation is made of the section of the surface layer obtained when the molded product is cut in its thickness direction from its surface. As long as the section is in a portion near the surface of the molded product (e.g., the portion within 30 μm from the surface), this section need not be measured entirely, but may be measured partially. However, a nearer portion to the surface, where characteristic segments easily show up, is more preferable. Too small an area of the portion which is measured would tend to cause errors. Thus, at least 10 μm square of that portion should preferably be measured.

This procedure is performed for arbitrary parts, preferably different parts, of the molded product, preferably at a plurality of (n) sites, normally 5 or more sites, more preferably, 10 or more sites, to avoid a bias in terms of the site of measurement. Thus, observations are made of the sections $X_1, X_2, X_3$ to $X_n$.

The value of (b/a) is obtained by measuring the major axis lengths and minor axis lengths of all the rubber particles noted in the sections based on the electron micrographs shot (FIG. 1 is an example), calculating the average major axis length b and the average minor axis length a as the averages of the respective lengths for the respective sections, and determining the value (b/a) by the results. The values (b/a) obtained for the respective sections are compared, and the maximum of the values is designated as (b/a)max., while the minimum of the values is designated as (b/a)min.

The rubber-occupied area ratio A is determined by subjecting the above-mentioned electron micrographs of the sections to ordinary image analysis, for example, using an image analyzer (LA-555D, a product of Pierce) incorporating basic image processing software (LA-555, a product of Pierce) and image analysis/calculation software (LA-555, a product of Pierce) to convert the sum of the sectional areas of the rubber particles (the rubber component portion) and the sum of the sectional areas of the matrix resin (the matrix portion) into binary digits as the area value; calculating the rubber-occupied area ratios for the respective sections; and further calculating the average of these ratios. The rubber-occupied area ratios obtained for the respective sections are compared, and the maximum of the values is designated as Amax., while the minimum of the values is designated as Amin.

The value of (b/a), as has been described, may be calculated from the measured major axis lengths and minor axis lengths of all the rubber particles noted in the sections based on the electron micrographs shot. However, this value may be determined by image processing of the sectional electron micrographs. Either method may be employed.

In the molded product of thermplastic resin in the present invention, the value (b/a) is 2 or less for all the sections measured in the above manner {equation (1)}. This fact means that the flatness (degree of deformation) of the rubber particles is small in the skin portion near the surface (especially, the portion within 30 $\mu$m from the surface) of the molded product. When the values of (b/a) for the respective sections are compared, the ratio of the maximum value (b/a)max. to the minimum value (b/a)min. is found to satisfy the condition of the equation (2)

$$1 \leq \{(b/a)\text{max.}/\}/\{(b/a)\text{min.}\} \leq 1.5 \quad (2)$$

This fact means that the rubber particles in minimally deformed, evenly particulate form are present in different parts of the molded product, and more specifically, that the deformation of the rubber particles is absolutely minimal in the different parts of the molded product, and limitedly deformed rubber particles exist almost uniformly in the respective parts of the molded product. If the value of (b/a) for each section exceeds 2, or if the value of {(b/a)max.}/{(b/a)min.} is more than 1.5, markedly deformed rubber particles are existent in the molded product, or rubber particles with marked deformation are concentrated in limited parts of the molded product, thus tending to cause deformation or cracking of the molded product.

When comparing the rubber-occupied area ratios A for the respective sections, the maximum value Amax. and the minimum value Amin. fulfill the conditions of the equations (3) and (4), respectively:

$$0 \leq (A\text{max.} - A)/A \leq 0.2 \quad (3)$$

$$0 \leq (A - A\text{min.})/A \leq 0.2 \quad (4)$$

When those values go beyond the defined ranges, this means that unbalanced presence of the rubber component takes place depending on the site of the molded product, thereby similarly causing the tendency toward the deformation or cracking of the molded product.

In order for the claimed molded product to be fully prevented from deformation or cracking, it should fulfill all of the above-described conditions at the same time. Lack of any one of the conditions would lead to the failure to attain the object of the present invention.

If the thermoplastic resin containing rubber particles is ABS resin, the failure to fulfill the aforementioned conditions would result in the tendency toward deformation or cracking of the molded product. Moreover, the metal layer plated on its surface may be poor in durability or may be uneven.

In plating a metal on the surface of the thermoplastic resin molded product in the present invention, the metal used is not restricted, and its examples include copper, nickel and chromium. Nor is the method of metal plating restricted. For example, wet plating methods such as electroplating, and dry plating methods such as vacuum deposition and sputtering may be used. The molded product may have mono plating layer or two or more plating Layers. Nor is there restriction on the thickness of the metal plating layer, but about 0.05 to 30 $\mu$m per one layer is preferred.

The molded product comprising a thermoplastic resin containing rubber particles according to the present invention is obtained by molding a rubber particles-containing thermoplastic resin by a method of molding known as one for thermoplastic resins, such as injection molding, injection compression molding, injection press molding, or compression molding. In such a molding method, a molten thermoplastic resin containing rubber particles undergoes force within a mold to have a desired shape, and the shaped resin is cooled and solidified to obtain a molded product.

The thermoplastic resin molded product according to the present invention should itself fulfill the aforesaid conditions {the conditions of equations (1) to (4)} at the same time, and the process for preparing the molded product has no restriction. That is, the molded product of the present invention can be produced by the above-mentioned molding method (e.g. injection press molding) using as a molding material a thermoplastic resin containing 5 to 40% by weight of rubber particles.

A preferred method for producing the thermoplastic resin molded product according to the present invention is, for instance, the following injection press molding: A pair of male and female molds are used which have cavity surfaces designed to correspond with a molded product having a predetermined shape. A thermoplastic resin containing rubber particles that has been heated above the melting temperature of a matrix resin by a plasticator is fed between both molds, put in a non-closed state, through a molten resin passageway provided in the molds. After or during this feeding, the molds are closed until the cavity clearance between the molds reaches a predetermined value. After pressing and cooling, the resulting molded product is withdrawn.

The production method for the molded product may itself be an arbitrary method. To obtain the claimed thermoplastic resin molded product, however, the molding conditions, such as the melting temperature of the resin, the mold temperature, the closing pressure and the closing speed during closing, should be selected so that the molded product prepared by the method will satisfy all of the aforementioned conditions concerned with the invention {the conditions of equations (1) to (4)}. In detail, when conventional molding conditions are employed in injection press molding, injection molding, injection compression molding, compression molding or the like, a strong shearing force works on the thermoplastic resin containing rubber particles, especially on a portion near its surface, thus causing deformation of the rubber particles, or uneven distribution of markedly deformed rubber particles, eventually leading to the failure to obtain a molded product satisfying all the aforementioned conditions related to the invention. In the present invention, by contrast, when any of the molding methods above is adopted, the molding conditions, such as the melting temperature of the resin, the mold temperature, the closing pressure and the closing speed during closing, are selected so that a shearing force on a portion near the surface of the thermoplastic resin containing rubber particles will be sufficiently small. Thus, a molded product satisfying all of the aforementioned conditions concerned with the invention {the conditions of equations (1) to (4)} is obtained.

The thermoplastic resin molded product of the present invention that fulfills all the specific conditions is minimally deformed, and faces little cracking. Because of these excellent characteristics, this molded product is applicable to a wide variety of uses, including household appliances and automobile parts. The thermoplastic resin molded product of the invention also involves minimal deformation and to easy to handle during use. Thus, it is used particularly preferably as car parts (e.g. front grills and door knobs) which are frequently mounted together with other parts.

As described above, the present invention can reliably provide a thermoplastic resin molded product containing rubber particles which possesses the excellent properties of being fully prevented from deformation or cracking, and giving a sufficiently highly durable metal plating layer, even when using ABS resin and applying a metal plating layer on its surface.

EXAMPLES

The present invention will be described by, although not limited to, the following test examples:

Test Example 1

A resin comprising rubber particles composed of a graft copolymer having styrene and acrylonitrile grafted to polybutadiene, and a matrix resin composed of a copolymer of styrene and acrylonitrile (the resin produced by Sumika A&L, Inc. and marketed under the trade name Klarastick GA-501; rubber particles content: about 17% by weight, number average particle diameter of the rubber particles: 0.4 μm) was fed to a plasticator, and heated at 260° C. to obtain a molten resin.

The molten resin was supplied between male and female molds (in a non-closed state) with a cavity clearance (the distance between the cavity surfaces of both molds) of 7 mm through a molten resin passageway provided in the male mold. Then, the molds were closed until the cavity clearance between the molds reached 3 mm, pressed and cooled to obtain a resin molded product of 340 mm in length, 270 mm in width, and 3 mm in thickness.

The molding conditions for this molding procedure were as follows:

Pressure loading: 100 tons
Closing speed: 3 mm/sec.
Mold temperature: 65° C. for the male and female molds
Injection pressure: 500 kg/cm$^2$
Injection speed: 75 cc/sec.
Screw revolution speed: 65 r.p.m.
Screw back-pressure: 10 kg/cm$^2$ (gauge pressure)

The resulting molded product was evaluated for deformation and cracking by the following methods. The results are shown in Table 1.

<Measurement of amount of deformation>

The molded product was allowed to stand on an evenly flat surface. Three of the four corners of the molded product were fixed to the flat surface, and the remaining corner was measured for the amount of float (mm) from the flat surface.

<Evaluation of cracking>

The whole of the molded product was immersed in a methanol solution having varying acetic acid concentration (the solution was only acetic acid if the acetic acid concentration was 100%), and left to stand therein for 10 minutes. Then, cracking of the molded product was evaluated based on blushing that occurred on the surface of the molded product.

+++ No blushing at acetic acid concentration of 100%
++ Blushing at acetic acid concentration of 90% or more
+ Blushing at acetic acid concentration of 80% or more but less than 90%
− Blushing at acetic acid concentration of less than 80%

Furthermore, the resulting molded product was cut at sites 130 mm from its widthwise opposite ends, parallel to the longitudinal direction, to form a plate-like sample 10 mm wide, 340 mm long, and 3 mm thick. This plate-like sample was cut at a site 30 mm from its longitudinal end, perpendicularly to the longitudinal direction, and then the cut portion was sliced parallel to the cut surface by means of an ultramicrotome to obtain a thin specimen of 3 mm in length, 10 mm in width, and about 700 angstroms in thickness.

This procedure was repeated to obtain a total of 10 thin specimens from different cut portions (30 mm, 27 mm, 24 mm, 21 mm, 18 mm, 15 mm, 12 mm, 9 mm, respectively, from the longitudinal end of the plate-like sample).

Then, each of the thin specimens was stained by the aforementioned method, and an electron micrograph was taken of a part 10 μm square in a portion within 10 μm from the surface of the molded product as the thin specimen. Based on the electron micrographs obtained, the ratios of the average major axis lengths b to the average minor axis lengths a of the rubber particles in the respective thin specimens were determined by the aforementioned method. Based on the ratios determined, the average of the ratios (b/a), the value of (b/a)max., the value of (b/a)min., and the value of {(b/a)max.}/{(b/a)min.} were calculated. At the same time, the electron micrographs of the respective thin specimens were image-processed by the aforementioned method to determine the rubber-occupied area ratios for the respective thin specimens. Based on the results obtained, the average of the rubber-occupied area ratios A, the value of Amax., the value of Amin., the value of (Amax.−A)/A, and the value of (A−Amin.)/A were calculated. The results are shown in Table 1.

An example of the electron micrograph obtained is presented as FIG. 1. In the thermoplastic resin molded product shown in FIG. 1, rubber particles 1 (portion shown as black dots in the micrograph) which have almost spherical shape are dispersed in a matrix resin 2 (portion other than black dots in the micrograph). The upper side of the figure corresponds to the surface side of the molded product.

Figure 2:
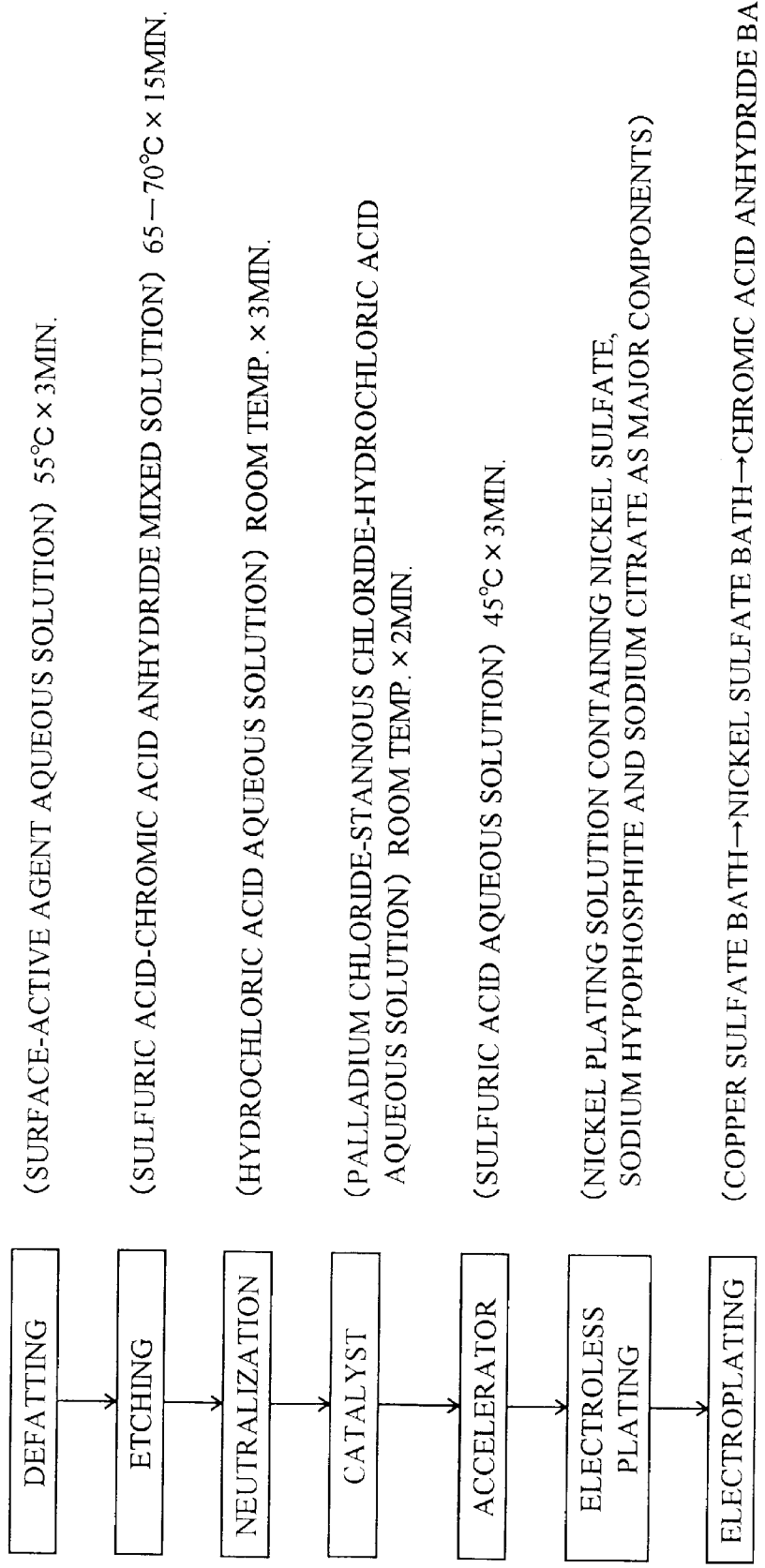
FIG. 2 is a flowchart showing a process for providing a metal plating layer on the surface of a thermoplastic resin molded product in test examples.

Separately, a metal plating layer was provided by the method shown in FIG. 2 on the surface of a resin molded product prepared by the same method as described above. The plated product obtained (the resin molded product having the metal plating layer) was subjected to the following "heat cycle test".

(Heat cycle test)

The plated product was allowed to stand for 15 minutes at room temperature and, subsequently, it was immediately put into a cooled gas-circulating type cooling apparatus which was maintained at −40° C. and then allowed to stand for 1 hour in the cooling apparatus. After the plated product was taken out from the cooling apparatus, it was allowed to stand for 15 minutes at room temperature and, subsequently, it was immediately put into an oven which was maintained at 80° C. and then allowed to stand for 1 hour in the oven. After the plated product was taken out from the oven, it was allowed to stand for 15 minutes at room temperature.

The plated product was subjected to ten cycle-treatment each one cycle of which consists of the above-mentioned sequence for cooling and heating (room temperature: 15 min. →−40° C.: 1 hour → room temperature: 15 min. →80° C.: 1 hour). The plated product was checked to ascertain whether or not some change such as blisters and cracks occurred on the metal film (plating layer) after each cycle mentioned above. A plated product which has no change was evaluated as passing (+), while a plated product which has some change was evaluated as failure (−). The result obtained by the above evaluation is shown in Table 1.

Test Example 2

A thermoplastic resin molded product was obtained in the same manner as in Test Example 1, except that the closing speed among the molding conditions was changed to 16 mm/sec.

The results of the evaluation of the deformation and cracking of the resulting molded product are given in Table 1.

The various parameters on the resulting molded product were measured in the same manner as in Test Example 1. The results are also shown in Table 1.

A metal plating layer was provided on the surface of the molded product in the same way as in Test Example 1. Similar to Test Example 1, the durability of the metal plating layer was sufficiently high (as shown in Table 1).

Test Example 3

A thermoplastic resin molded product was obtained in the same manner as in Test Example 1, except that the closing speed among the molding conditions was changed to 40 mm/sec.

The results of the evaluation of the deformation and cracking of the resulting molded product are given in Table 1.

The various parameters on the resulting molded product were measured in the same manner as in Test Example 1. The results are also shown in Table 1.

A metal plating layer was provided on the surface of the molded product in the same way as in Test Example 1. Similar to Test Example 1, the durability of the metal plating layer was sufficiently high (as shown in Table 1).

Test Example 4

The same resin as used in Test Example 1 was fed to a plasticator, and heated at 260° C. to obtain a molten resin.

The molten resin was supplied between male and female molds (in a non-closed state) with a cavity clearance of 3 mm through a molten resin passageway provided in the male mold. Then, the molds were subjected to dwelling, and cooled to obtain a resin molded product of 340 mm in length, 270 mm in width, and 3 mm in thickness.

The molding conditions for this molding procedure were as follows:

Pressure loading: 300 tons
Dwell pressure: 30 kg/cm
Mold temperature: 65° C. for the male and female molds
Injection pressure: 700 kg/cm$^2$
Injection speed: 80 cc/sec.

The results of the evaluation of the deformation and cracking of the resulting molded product are given in Table 1.

The various parameters on the resulting molded product were measured in the same manner as in Test Example 1. The results are also shown in Table 1.

A metal plating layer was provided on the surface of the molded product in the same way as in Test Example 1. Similar to Test Example 1, the durability of the metal plating layer was sufficiently-high (as shown in Table 1).

Test Example 5

The same resin as used in Test Example 1 was fed to a plasticator, and heated at 260° C. to obtain a molten resin. The molten resin began to be supplied between male and female molds (in a non-closed state) with a cavity clearance of 3.5 mm through a molten resin passageway provided in the male mold. At a time when part of the molten resin in an amount not enough to fill the cavity between the molds (70% by weight based on the required amount) was fed, closure of the molds was started. When the cavity clearance reached 3 mm, supply of the remaining resin (30% by weight based on the required amount) was completed simultaneously. Then, the molds were pressurized, and cooled to obtain a resin molded product of 340 mm in length, 270 mm in width, and 3 mm in thickness.

The molding conditions for this molding procedure were as follows:

Pressure loading: 150 tons
Closing speed: 3 mm/sec.
Mold temperature: 75° C. for the male and female m molds
Injection pressure: 700 kg/cm$^2$
Injection speed: 85 cc/sec.

The results of the evaluation of the deformation and cracking of the resulting molded product are given in Table 1.

The various parameters on the resulting molded product were measured in the same manner as in Test Example 1. The results are also shown in Table 1.

A metal plating layer was provided on the surface of the molded product in the same way as in Test Example 1. Similar to Test Example 1, the durability of the metal plating layer was sufficiently high (as shown in Table 1).

Test Example 6

A thermoplastic resin molded product was obtained in the same manner as in Test Example 4, except that the molding conditions were changed as follows:

Pressure loading: 400 tons
Dwell pressure: 90 kg/cm$^2$
Mold temperature: 55° C. for the male and female molds
Injection pressure: 1200 kg/cm$^2$
Injection speed: 100 cc/sec.

The results of the evaluation of the deformation and cracking of the resulting molded product are given in Table 1.

The various parameters on the resulting molded product were measured in the same manner as in Test Example 1. The results are also shown in Table 1.

Figure 3:
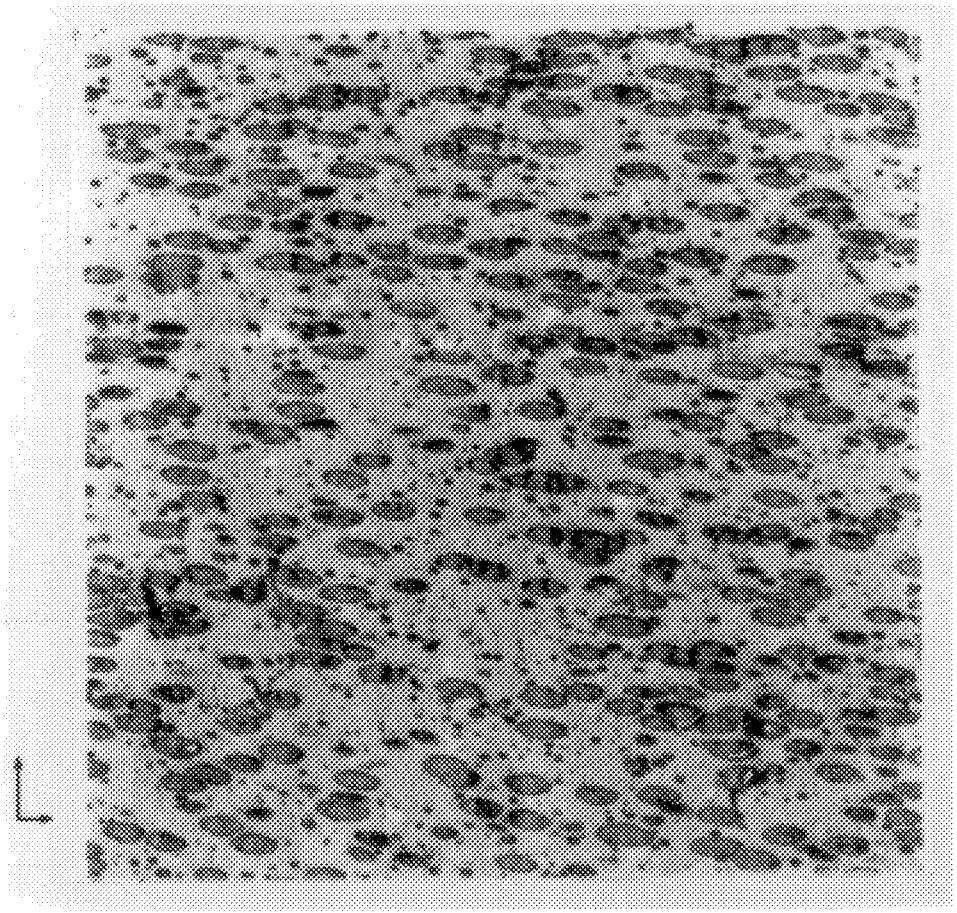
FIG. 3 is an electron micrograph (10,000×) of a section in the thickness direction of a portion within 10 μm from the surface of an example of a conventional thermoplastic resin molded product.

An example of the electron micrograph obtained is shown in FIG. 3. In the thermoplastic resin molded product shown in FIG. 3, rubber particles 1 (portion shown as black dots in the micrograph) which have flattened shape are dispersed in a matrix resin 2 (portion other than black dots in the micrograph). The upper side of the figure corresponds to the surface side of the molded product.

A metal plating layer was provided on the surface of the molded product in the same way as in Test Example 1. The durability of the metal plating layer was not sufficient (as shown in Table 1).

Test Example 7

A thermoplastic resin molded product was obtained in the same manner as in Test Example 4, except that the pressure loading was changed to 400 tons, the dwell pressure to 90 kg/cm$^2$, the mold temperature to 55° C. for the male and female molds, and the injection pressure and the injection speed to two stages (the injection pressure and the injection speed were 1,200 kg/cm$^2$ and 100 cc/sec, respectively, until the molten resin in an amount of 30% by weight based on the required amount was fed; and the injection pressure and the injection speed were 600 kg/cm$^2$ and 85 cc/sec, respectively, when the remaining molten resin in an amount of 70% by weight was fed).

The results of the evaluation of the deformation and cracking of the resulting molded product are given in Table 1.

The various parameters on the resulting molded product were measured in the same manner as in Test Example 1. The results are also shown in Table 1.

A metal plating layer was provided on the surface of the molded product in the same way as in Test Example 1. The durability of the metal plating layer was not sufficient (as shown in Table 1).

Test Example 8

Fine powder of a graft copolymer having styrene and acrylonitrile grafted to polybutadiene (corresponding to the rubber component of the resin used in Test Example 1), and pellets of a copolymer of styrene and acrylonitrile (corresponding to the matrix resin of the resin used in Test Example 1) were dry-blended in the same proportions as those of the rubber component and the matrix resin in the resin used in Test Example 1, to obtain a molding material.

This molding material was fed to a plasticator, and heated at 260° C. to obtain a molten resin. The molten resin was subjected to the same procedure as in Test Example 1, except that the screw revolution speed was changed to 120 r.p.m., and the screw back-pressure to 5 kg/cm$^2$ (gauge pressure). A thermoplastic resin molded product was obtained thereby.

The results of the evaluation of the deformation and cracking of the resulting molded product are given in Table 1.

The various parameters on the resulting molded product were measured in the same manner as in Test Example 1. The results are also shown in Table 1.

A metal plating layer was provided on the surface of the molded product in the same way as in Test Example 1. The durability of the metal plating layer was not sufficient (as shown in Table 1).

TABLE 1

| | Test Examples | | | | | | | |
|---|---|---|---|---|---|---|---|---|
| | 1 | 2 | 3 | 4 | 5 | 6 | 7 | 8 |
| (b/a) | 1.10 | 1.30 | 1.51 | 1.79 | 1.33 | 3.70 | 1.60 | 1.25 |
| {(b/a)max.} (X) | 1.11 | 1.35 | 1.81 | 1.96 | 1.66 | 4.11 | 4.31 | 1.33 |
| {(b/a)min.} (Y) | 1.08 | 1.21 | 1.23 | 1.61 | 1.22 | 3.11 | 1.41 | 1.21 |
| (X)/(Y) | 1.02 | 1.15 | 1.47 | 1.22 | 1.36 | 1.36 | 3.06 | 1.10 |
| A (%) | 17.9 | 18.2 | 17.8 | 18.3 | 17.8 | 17.9 | 17.6 | 17.6 |
| Amax. | 18.1 | 18.9 | 18.6 | 18.9 | 18.3 | 18.2 | 18.2 | 21.6 |
| Amin. | 17.6 | 17.5 | 17.2 | 17.6 | 17.6 | 17.5 | 17.2 | 13.1 |
| (Amax. − A)/A | 0.01 | 0.04 | 0.04 | 0.03 | 0.03 | 0.02 | 0.03 | 0.23 |
| (A − Amin.)/A | 0.02 | 0.04 | 0.04 | 0.04 | 0.01 | 0.02 | 0.02 | 0.26 |
| Amount of deformation (mm) | 0 | 0 | 0.5 | 1.5 | 0.5 | 10.5 | 15.5 | 6.5 |
| Cracking | +++ | ++ | ++ | + | ++ | − | − | − |
| Durability of plating layer | + | + | + | + | + | − | − | − |

As shown in the results indicated in Table 1, the thermoplastic resin molded products of the present invention (Test Examples 1 to 5) in which the ratio concerning the shapes of the rubber particles near the surface of the molded product {value of (b/a)}, the ratio concerned with variations in their shapes {value of (b/a)max./(b/a)min.}, and the ratio related to the variation in their abundance {value of (Amax.−A)/A and value of (A−Amin.)/A} all fulfilled the conditions relevant to the present invention {the conditions of equations (1) to (4)} were fully prevented from deformation or cracking. When metal plating layers were provided on their surfaces, moreover, the durability of the metal plating layers was sufficiently high.

In the control thermoplastic resin molded products (Test Examples 6 to 8) in which any one of the ratio concerning the shapes of the rubber particles near the surface of the molded product {value of (b/a)}, the ratio concerned with variations in their shapes {value of (b/a)max./(b/a)min.}, and the ratio related to the variation in their abundance {value of (Amax.−A)/A and value of (A−Amin.)/A} was outside the conditions relevant to the present invention {the conditions of equations (1) to (4)}, on the other hand, deformation or cracking occurred, and the durability of the metal plating layers applied was low.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Application No.5443/1996 filed on Jan. 17, 1996 is hereby incorporated by reference.

What is claimed is:

1. A thermoplastic resin molded product which is a molded product comprising a thermoplastic resin containing 5 to 40% by weight of rubber particles, wherein the rubber particles present near the surface of said molded product fulfill conditions of the equations (1) to (4):

$$(b/a) \leq 2 \tag{1}$$

where a and b denote the average minor axis length and the average major axis length, respectively, of the rubber particles in a section in a thickness direction of said molded product, $$1 \leq \{(b/a)\text{max.}\}/\{(b/a)\text{min.}\} \leq 1.5 \tag{2}$$

where {(b/a)max.} and {(b/a)min.} stand for the maximum value and minimum value, respectively, of the ratios of b to a (b/a) in a plurality of sections in the thickness direction of said molded product, and $$0 \leq (A\text{max.} - A)/A \leq 0.2 \quad (3)$$

$$0 \leq (A - A\text{min.})/A \leq 0.2 \quad (4)$$

where Amax. and Amin. represent the maximum value and minimum value, respectively, of the proportions of the areas accounted for by the rubber particles in a plurality of sections in the thickness direction of said molded product, and A represents the average value of the proportions of the areas accounted for by the rubber particles in a plurality of sections in the thickness direction of said molded product.

2. The thermoplastic resin molded product of claim 1, wherein the rubber particles near the surface of said mold product are rubber particles present in a range within 30 μm from the surface of said molded product.

3. The thermoplastic resin molded product of claim 1, wherein said rubber particles have a number average particle diameter within the range of from 0.05 to 3 μm.

4. The thermoplastic resin molded product of claim 1, wherein the rubber component constituting said rubber particles is a graft copolymer having a vinyl monomer grafted to a diene rubbery polymer.

5. The thermoplastic resin molded product of claim 1, wherein the thermoplastic resin containing rubber particles is ABS resin.

6. The thermoplastic resin molded product of claim 1, further including a metal plating layer applied to the surface of said molded product.

7. The thermoplastic resin molded product of claim 1, wherein said molded product is an automobile part.

* * * * *